(12) United States Patent
Knapp

(10) Patent No.: US 6,862,966 B2
(45) Date of Patent: Mar. 8, 2005

(54) DEVICE TO CUT AND DEBURR METAL AND METHOD OF USE THEREOF

(75) Inventor: James Knapp, Toledo, OH (US)

(73) Assignee: Toledo Metal Spinning Company, Toledo, OH (US)

( * ) Notice: Subject to any disclaimer, the term of this patent is extended or adjusted under 35 U.S.C. 154(b) by 108 days.

(21) Appl. No.: 10/170,780

(22) Filed: Jun. 13, 2002

(65) Prior Publication Data

US 2002/0189414 A1 Dec. 19, 2002

Related U.S. Application Data

(60) Provisional application No. 60/297,896, filed on Jun. 13, 2001.

(51) Int. Cl.⁷ .............................. B23B 5/16; B23B 27/22
(52) U.S. Cl. .......................... 82/1.11; 82/113; 407/114; 407/113
(58) Field of Search .................. 82/1.11, 113; 409/132, 409/138, 140, 293, 297, 298, 300, 303, 346; 407/107, 113, 114, 115, 116, 117, 102, 103, 104, 108

(56) References Cited

U.S. PATENT DOCUMENTS

| | | | |
|---|---|---|---|
| 3,574,911 A | * 4/1971 | Penoyar | 407/114 |
| 3,636,602 A | * 1/1972 | Owen | 407/113 |
| 4,140,431 A | * 2/1979 | Friedline et al. | 407/114 |
| 4,248,553 A | * 2/1981 | Kraemer | 407/114 |
| 4,681,486 A | * 7/1987 | Hale | 407/114 |
| 4,867,616 A | * 9/1989 | Jakubowicz | 407/58 |
| 5,076,122 A | * 12/1991 | Katzenburger et al. | 82/113 |
| 5,477,721 A | * 12/1995 | Barnes | 72/203 |
| 5,752,402 A | * 5/1998 | Barnes | 72/203 |
| 5,879,823 A | * 3/1999 | Prizzi et al. | 428/698 |
| 5,954,464 A | * 9/1999 | Dansereau et al. | 409/293 |
| 6,632,051 B1 | * 10/2003 | Wermeister | 407/114 |

OTHER PUBLICATIONS

Hauert et al., "From Alloying to Nanocomposites—Improved Performance of Hard Coatings**", Advanced Engineering Materials, 2000, 247–259.*

* cited by examiner

Primary Examiner—A. L. Wellington
Assistant Examiner—Dana Ross
(74) Attorney, Agent, or Firm—Marshall & Melhorn LLC

(57) ABSTRACT

An improved cutting insert for a cutting tool is designed from a blank of a regular geometry. The blank is designed so that an even number of channels are spaced equidistant around the periphery of the blank. The channels are elliptical in shape, and are arranged in alternating directions around the face of the insert. The grooves are designed to have a 7 degree relief angle.

16 Claims, 2 Drawing Sheets

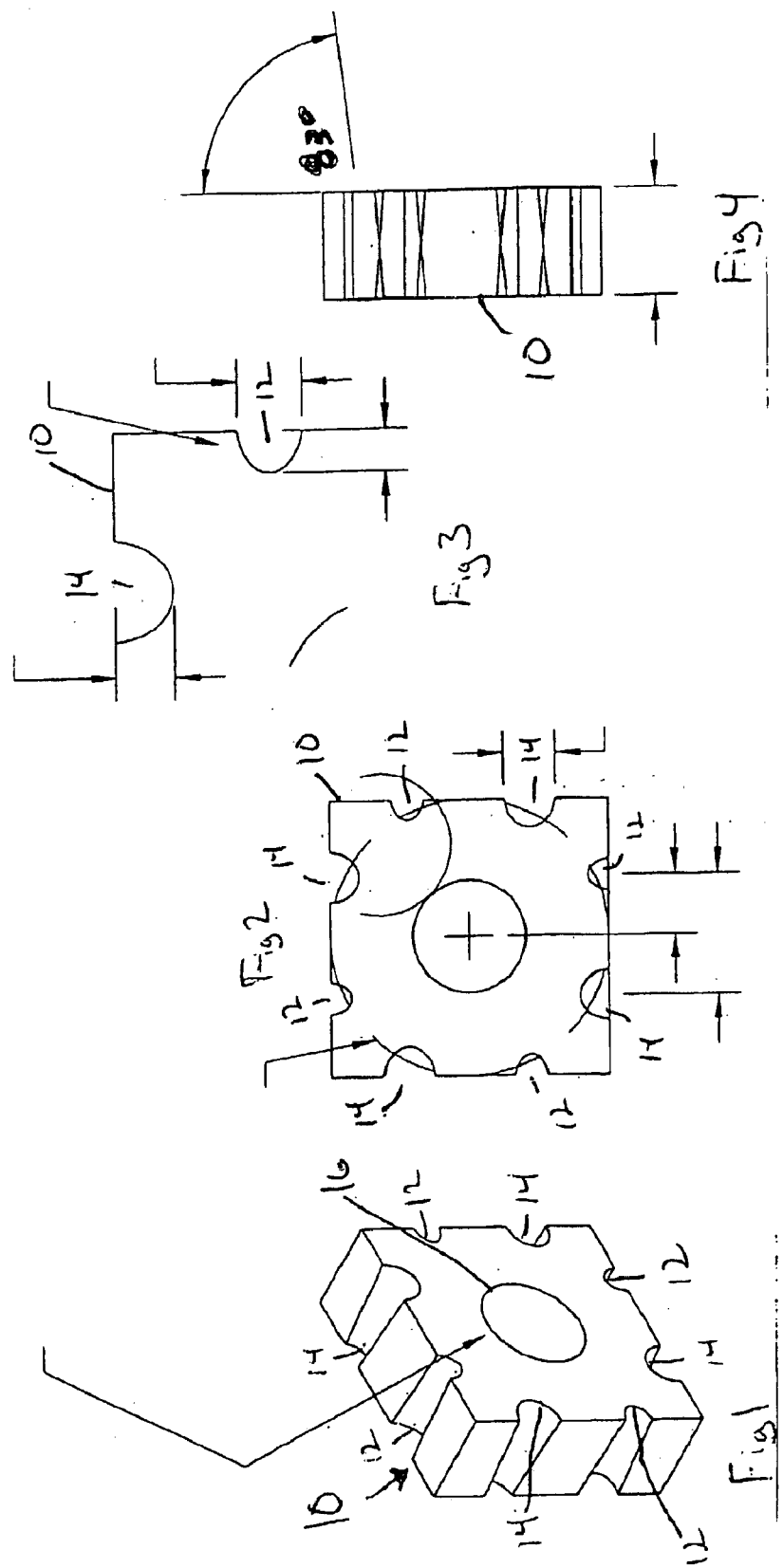

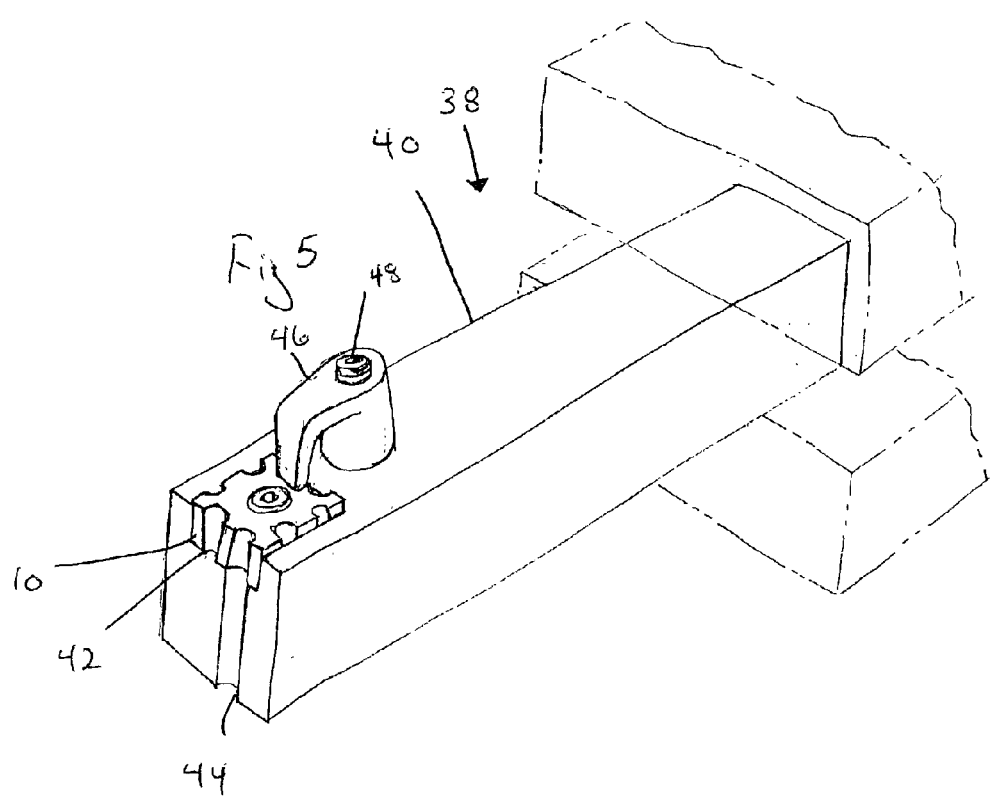

DEVICE TO CUT AND DEBURR METAL AND METHOD OF USE THEREOF

CONTINUING APPLICATION DATA

This application claims priority from U.S. provisional patent application Ser. No. 60/297,896, filed on Jun. 13, 2001. U.S. provisional patent application Ser. No. 60/297,896 was pending as of the filing date of the present application. U.S. provisional patent application Ser. No. 60/297,896 is hereby incorporated by reference as if set forth in its entirety herein.

BACKGROUND OF THE INVENTION

1. Field of the Invention

The present invention relates to the cutting of metal, for example, sheet metal. Typical cutting devices utilize a cutting tool with a holder and a specialized insert chosen for the cut desired. The present invention discloses an improved cutting insert for use in cutting metal.

2. Summary of Related Art

Known cutting devices utilize at least one cutting insert and a holder, which aligns the cutting inserts in the proper alignment for the desired trimming of the metal.

A known cutting insert is cut from a square blank and has two opposing edges with three cutting channels each and the other two opposing edges have 2 channels each, for a total of 10 channels. Each of these channels, in the known insert, are rounded (semi-circular). This insert, being of necessity asymmetrical about its central axis (because of the varying number of channels) must be removed and repositioned or aligned (reindexed) each time a different cutting channel is selected. This is very inefficient and greatly decreases the efficiency of the production runs. In addition, the known inserts produce finished product with burrs, which must then be ground down to a suitable finish.

Additionally, the known inserts are of limited durability, sometimes yielding as few as ten cuts before damage to the insert yields it unusable.

While this known insert is suitable for the intended purpose, a more time and cost efficient solution would be preferable.

Therefore, one object of the present invention is to maximize the service life of the cutting insert in a metal cutting tool.

A further object of the invention to increase the throughput of a metal cutting device compared to known metal cutting devices.

It is a further object of the present invention to provide a cutting insert which does not have to be realigned each time an alternative cutting channel is selected.

An additional object of the invention is to provide a smoother, essentially burr free surface of the cut metal portions, after cutting by the improved cutting tool.

An additional object of the present invention is to provide an improved method for cutting and shaping metal surfaces utilizing the improved tool of the present invention.

SUMMARY OF THE INVENTION

In accordance with at least one object of the present invention, there is provided a cutting insert with multiple cutting channels arranged about the periphery of the substantially square insert. Preferably, the object has 8 cutting channels arranged about the periphery. Preferably, two cutting channels are arranged on each of the four edges of the insert. The cutting channels are arranged in a manner such that each of the first four channels (one of the channels on each of the edges) can be sequentially engaged by a 90 degree rotation of the cutting insert in the holder. The remaining 4 channels (the other channel on each of the four edges) can be engaged by reversing the facing of the insert in the holder, and thereafter rotating the insert again by 90 degree increments.

It is integral to at least one embodiment of the present invention that the cutting channels in the insert be elliptical, rather than the known, customarily used semicircular channels. The selection of an elliptical channel allows the cutting tool to trim a part without or substantially without leaving a burr.

Selection of the ratio of the A and C dimensions and the axes of the elliptical channels are important criteria in making the insert. There is a compromise on the choice of the A and C dimensions and the elliptical axis. In order to provide for the broadest possibility of material thicknesses, the A dimension should be greater than the C dimension, and the ratio of the ellipses axes should be approximately 1:1. This, however, can compromise the finish of the part. In order to form the best possible finish, the A and C dimensions should be approximately equal and the ellipse axis should be approximately 2:1. Therefore, the present invention includes selecting cutting channels based upon either of these dimensional preferences. It is also possible within the scope of the present invention to use a greater ratio of the ellipse axis, possibly 3:1 or even 4:1. Ratios greater than this, however, can adversely affect the quality of the finish and thus a greater ratio is typically not preferred.

The throughput of a cutting device utilizing the insert of the present invention can be up to 4 times, or greater, than the output of conventional cutting devices. Additionally, the present invention can provide a metal finish which does not need subsequent air grinding in order to yield an acceptably smooth, burr free surface. Also, the inserts described herein can yield between 300–1000 cuts per each cutting edge, of which each insert has 8. Due to the symmetrical nature of the insert, indexing can be done up to 8 times per insert without making any adjustments to the tool holder. Additionally, the insert can be replaced and the new insert will also be in the correct alignment. Therefore, an entire production run can be completed without adjusting the tool holder. This provides a much higher throughput than processes with known inserts.

BRIEF DESCRIPTION OF THE DRAWINGS

The above, as well as other advantages of the present invention, will become readily apparent to those skilled in the art from the following detailed description when considered in light, of the accompanying drawings in which:

FIG. 1 is a perspective view of an embodiment of the present invention.

FIG. 2 illustrates a view of one face of the embodiment of the present invention as shown in FIG. 1.

FIG. 3 illustrates an enlarged view of a portion of the embodiment shown in FIG. 1, illustrating a corner of the embodiment and the two cutting channels adjacent the corner.

FIG. 4 illustrates a sectional view of the embodiment shown in FIG. 1.

FIG. 5 shows an embodiment of a holder to hold the insert for the cutting process.

DETAILED DESCRIPTION OF THE PREFERRED EMBODIMENT

FIGS. 1, 2, 3 and 4 illustrate an embodiment of a cutting insert 10 in accordance with the present invention. The insert 10 is substantially in the form of a square with a pair of channels 12, 14 cut into each edge. The depth of the channels 12, 14 can vary over the length of the channels 12, 14 and is chosen based on the material to be cut and the final product and finish desired. The midpoint of each channel is preferably substantially equidistant from the midpoint of the insert. This is significant in that it allows the insert to be reindexed to a different cutting channel without adjusting the tool holder. In this embodiment, the channel is centered about 0.109 inches from the midpoint of the insert.

It is especially significant to the present invention that each channel is preferably cut in the shape of an ellipse.

It is significant to the present invention that the dimensions of the channel 12, 14 are such that each of the outer walls of the channel preferably forms an angle of approximately 7 degrees from parallel, thus diverging at an angle of 14 degrees relative to one another.

This relief angle is selected based, largely, on the material to be cut. This angle is ideal for cutting materials such as stainless steel and hot roll steel. This selected angle allows free cutting resulting in improved surface finish and also a longer tool life. As shown in FIG. 4, the relief angle can preferably be a 7° angle, as shown by its complementary 83° angle.

FIG. 5 discloses an embodiment of a tool for holding the cutting insert according to the present invention. The holder 38 includes a rectangular body 40 with a notch 42 cut out of one end. The notch 42 is designed to hold the insert 10 with a minimum of clearance to allow a tight fit of the insert 10 in the notch 42. This is necessary as the insert must be fixed relative to the holder 38 during cutting.

The holder also includes a channel 44. the channel 44 is placed along one end of the rectangular body 40 so that it is aligned with the notch 12 of the cutting insert 10. the cutting tool 38 also includes a holding clip 46 which is threaded along a threaded shaft 48. The threaded shaft 48 is fixed in the rectangular body 40 and the holding clip 46 is rotated about the threaded shaft 48 until it securely holds the insert 10 in position. Thus the insert 10 is fixed relative to the holder 38 for cutting operations.

In addition, the insert can be made of any material commonly used in cutting applications. In the context of the present invention, it has been found that a cobalt matrix has been especially suitable for use as the cutting insert. In cutting operations, sometimes the material to be cut is not of the correct geometry. Typically, the above described cutting operation utilizes round parts to be cut. If the part to be cut is not sufficiently round, it can cause the cutting tool to jam and result in an "interrupted cut". The above discussed cobalt matrix insert is especially suitable based upon its resistance to the stresses caused by these interrupted cuts. An example of such a material would be VC101 sintered carbide from Valenite Die and Wear/Walmet, 510 Griffin Rd., West Branch Mich. 48661 (517) 345 –2622. The material has a chemical composition by weight of 90% WC and 10% Co. Average grain size is less than 1.0 $\mu$m, with a transverse rupture strength of 2700 $N/mm^2$, with a density of 14.5 $g/cm^3$.

Typically, the cutting inserts also receive an exterior coating. A preferred coating consists of TiAlN (titanium aluminum nitride), which has an excellent high temperature performance. Often these cutting operations are done at high temperatures, and with minimal or no lubrication. The above discussed coating material is especially suitable for cutting operations under these conditions. Other coatings may be suitable based upon the materials being cut and the operating conditions of the cutting process.

The present invention is especially advantageous in that the finished product can be burrless or essentially burrless when formed. This greatly decreases the processing time and cost of the finished material.

Use of the inventive cutting insert is similar to that normally used in the field. The operation is different in that first, the tool, as discussed above, can be rotated 90 degrees to provide additional cutting surfaces, upon wear of the cutting surface in use. The insert can also be flipped, i.e. have the face abutting the holder reversed to face outward, with the previously outwardly facing face then abutting the holder. Because of the alternating alignment of the grooves (with one of the grooves on each end having its widest point at one face and the other groove having its narrowest point at the same face) this will then allow the additional four channels to cut with no additional adjustment on the cutting tool needed.

One method of shaping metal with the above described cutting holder and insert involves placing the insert on the holder and securing it into position. The holder is then fixed in place relative to the metal to be cut. The uncut metal is placed on a rotating body, which rotates the metal relative to the cutting insert. Then, depending on the configuration of the cutting tool, either the metal is moved into contact with the cutting tool or the cutting tool moves into contact with the metal. The metal is then rotated by the rotating body and is shaped by contact with the cutting groove of the insert.

EXAMPLES

In a first example, the insert 10 is cut from a ½ inch blank with a 0.203 inch diameter central channel. The channels are centered 0.125 inches from the center of the insert and have a width of 0.126 inches at the widest and about 0.080 inches at the narrowest point. The depth of the insert runs from about 0.073 inches to about 0.050 inches from deepest to shallowest. The ellipse has axes of 0.150 inches by 0.080 inches. The thickness of the insert is about 0.188 inches with the relief angles again cut at 7 degrees.

In a second example, the insert 10 is cut from a ½ inch blank with a 0.203 inch diameter central channel. The channels are centered 0.109 inches from the center of the insert and have a width of 0.158 inches at the widest and about 0.125 inches at the narrowest point. The depth of the insert runs from about 0.071 inches to about 0.055 inches from deepest to shallowest. The ellipse has axes of 0.200 inches by 0.140 inches. The thickness of the insert is about 0.188 inches with the relief angles again cut at 7 degrees.

In a third example, the channels 12, 14 are cut to a depth of about 0.053 inch at the deepest edge and running linearly to a depth of about 0.037 inch at the shallowest part. Similarly, the width of each channel 12, 14 at the widest end (which, at least in this embodiment also corresponds to the deepest end) and is about 0.092 and at the narrowest end is 0.059 inches.

In the embodiment illustrated herein, the ellipse has a primary axis of about 0.090 inches and a secondary axis of about 0.060 inches. Overall, the insert 10 can have a thickness of about 0.188 inches. The central bore 16 of the insert can have a diameter of about 0.203 inches. The insert 10 itself has an edge length of about 0.500 inches. While the above discussion centers on a square 0.5 inch blank, any regular geometry (e.g. triangle, hexagon, octagon, etc.) would be suitable for the intended purpose. In addition, a circular insert with the channels cut at regular intervals would also be suitable for the purpose intended. Thus, any blank which would allow an even number of elliptical channels cut in regular interval around the periphery of the insert would be acceptable for use in the present invention. The holder would then need to have a notch 42 designed to fit the chosen geometry of the insert. The above indicated blank is utilized because of its general availability.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of cutting and de-burring a metal object, comprising:

providing a cutting tool with a cutting arm;

providing a cutting insert having a front side and a back side and a plurality of side surfaces, each of said side surfaces comprising first and second elliptical cutting channels, each of said first cutting channels being configured to provide a specific cut upon the front of the insert being disposed facing the cutting arm of the cutting tool, and each of said second cutting channels being configured to provide substantially the same cut as the first cutting channels upon the back of the insert being disposed facing the cutting arm of the cutting tool;

said first elliptical cutting channels beginning at said front side tapering across said side surfaces and ending with an elliptical terminus in said back side;

said second elliptical cutting channels beginning at said back side tapering across said side surfaces and ending with an elliptical terminus in said front side;

disposing the cutting insert in the cutting tool with one of the cutting channels in position to cut a piece of metal;

cutting a plurality of metal objects with one of said first cutting channels of said cutting insert;

removing the cutting insert from the cutting tool; and replacing the cutting insert in the cutting tool with a different one of said cutting channels being in position to cut a piece of metal.

2. The method of claim 1, wherein a single cutting insert is used at a time to cut.

3. The method of claim 1, wherein said cutting arm and said cutting insert are stationary during said cutting.

4. The method of claim 1, wherein said first cutting channels and said second cutting channels provide a cut of substantially the same size and finish.

5. The method of claim 1, wherein said cutting insert is substantially square and said cutting insert is removably located in a substantially square cut-out section of said cutting tool.

6. A cutting insert for a device to cut and de-burr metal, said insert comprising:

a body secured to a non-rotating arm, said body having a first surface and a second surface, said first surface and said second surface disposed parallel to one another;

a plurality of side surfaces connecting said first surface and said second surface;

a first elliptical cutting channel in each of said plurality of side surfaces for cutting at least one sheet metal edge and for leaving said edge substantially burr free, said first elliptical cutting channel for cutting in a first direction, said first elliptical cutting channel beginning at said first surface, tapering across one of said plurality of side surfaces, and ending with an elliptical terminus in said second surface;

a second elliptical cutting channel in each of said plurality of side surfaces for cutting at least one other sheet metal edge and for leaving said other edge substantially burr free, said second elliptical cutting channel for cutting in a second direction, said second elliptical cutting channel beginning at said second surface, tapering across one of said plurality of side surfaces, and ending with an elliptical terminus in said first surface, wherein each of said second elliptical cutting channels are parallel to each of said first elliptical cutting channels on a same side surface; and at least one non-cutting flat located between each of said first elliptical cutting channels and each of said second elliptical cutting channels on each of said sides.

7. The insert of claim 6, wherein said plurality of side surfaces are located at right angles to both said first surface and said second surface, and said side surfaces are located at right angles to one another.

8. The insert of claim 6, wherein each of said first elliptical cutting channels and each of said second elliptical cutting channels are configured to provide a cut of substantially the same size and finish.

9. The insert of claim 6, wherein each of said first elliptical cutting channels and each of said second elliptical cutting channels have essentially the same dimensions.

10. The insert of claim 6, wherein the depth of each of said first elliptical cutting channels and the depth of each of said second elliptical cutting channels varies along the length of each of said cutting channels.

11. The insert of claim 6, wherein said body is comprised of a cobalt matrix material.

12. The insert of claim 6, wherein said body is provided with an outer coating comprising titanium aluminum nitride.

13. The insert of claim 6, wherein each of said first elliptical cutting channels and each of said second elliptical cutting channels has about a 7 degree relief angle.

14. The insert of claim 6, wherein said first elliptical cutting channels and said second elliptical cutting channels are located the same distance between one another on each of said side surfaces.

15. The cutting tool of claim 14, wherein said plurality of side surfaces are located at right angles to both said first surface and said second surface, and said side surfaces are located at right angles to one another.

16. A cutting tool for cutting and de-burring metal, comprising:

a stationary arm for selectively holding a substantially square cutting insert, said arm comprising a substantially square cut-out section for receiving said cutting insert;

a first surface of said cutting insert and a second surface parallel to said first surface, said first surface and said second surface connected by a plurality of side surfaces;

a first elliptical cutting channel in each of said plurality of side surfaces for cutting at least one sheet metal edge and for leaving said edge substantially burr free, said first elliptical cutting channel for cutting in a first direction, said first elliptical cutting channel beginning at said first surface, tapering across one of said plurality of side surfaces, and ending with an elliptical terminus in said second surface;

a second elliptical cutting channel in each of said plurality of side surfaces for cutting at least one other sheet metal edge and for leaving said other edge substantially burr free, said second elliptical cutting channel for cutting in a second direction, said second elliptical cutting channel beginning at said second surface, tapering across one of said plurality of side surfaces, and ending with an elliptical terminus in said first surface; and at least one non-cutting flat located between each of said first elliptical cutting channels and each of said second elliptical cutting channels on each of said sides.

* * * * *